(12) United States Patent  
Husges

(10) Patent No.: US 7,213,556 B2  
(45) Date of Patent: May 8, 2007

(54) FLAP BEARING MOUNTING

(75) Inventor: Hans-Jurgen Husges, Willich (DE)

(73) Assignee: Pierburg GmbH, Neuss (DE)

( * ) Notice: Subject to any disclaimer, the term of this patent is extended or adjusted under 35 U.S.C. 154(b) by 177 days.

(21) Appl. No.: 11/070,222

(22) Filed: Mar. 3, 2005

(65) Prior Publication Data  
US 2005/0196309 A1 Sep. 8, 2005

(30) Foreign Application Priority Data  
Mar. 4, 2004 (DE) .................... 10 2004 010 555

(51) Int. Cl.  
*F02M 35/10* (2006.01)
(52) U.S. Cl. .................. 123/184.53; 123/308
(58) Field of Classification Search ........... 123/184.53, 123/184.55, 184.56, 308  
See application file for complete search history.

(56) References Cited  
FOREIGN PATENT DOCUMENTS

| DE | 19614474 A1 | 10/1997 |
|---|---|---|
| DE | 19944623 A1 | 3/2001 |
| DE | 19946861 A1 | 4/2001 |
| DE | 10143384 C1 | 4/2003 |
| DE | 10236393 A1 | 3/2004 |

*Primary Examiner*—Noah P. Kamen  
(74) *Attorney, Agent, or Firm*—Griffin & Szipl, P.C.

(57) ABSTRACT

Flap bearing mountings of the present invention are for mounting flap devices (5), such as switch-over, tumble, or swirl flap devices, on a housing (2) of an air intake port system (1) of a combustion engine. Mounting of flap devices (5) is accomplished by thermoforming projections (19) that are formed on bearing elements (10) of the flap device (5) and that extend through corresponding apertures (20) formed in the housing (2) of the air intake port system (1) of a combustion engine. This structure makes it possible to cost-effectively and precisely mount one-piece flap shafts (6, 7) in all air intake port systems (1), without having to use additional mounting elements. Through the exact, precise fixing of the mounted position, deformation of the shaft (6, 7), having flap bodies (8) arranged thereon, is reliably prevented and the service life of the entire flap device (5) is prolonged.

13 Claims, 3 Drawing Sheets

FLAP BEARING MOUNTING

This application claims priority from German Patent Application No. 10 2004 010 555.3, filed Mar. 4, 2004, the entire disclosure of which is incorporated herein by reference.

FIELD OF THE INVENTION

The present invention relates to a flap bearing mounting disposed on an air intake port system of a combustion engine, wherein the air intake port system (also known as an "intake manifold") features an at least one-piece housing in which a flap device is arranged that features a flap shaft on which at least one flap body is arranged and at least one bearing element in which the flap shaft is supported, whereby the flap device is mounted in the housing of the air intake port system via the at least one bearing element.

BACKGROUND OF THE INVENTION

It is known in the prior art to arrange and mount flap devices in air intake port systems of combustion engines, wherein various kinds of flap devices function in different ways. In other words, flap devices can serve, in a known manner, as switch-over flaps to switch over the effective length of the intake port pipe of an air intake port system, or as tumble flaps or swirl flaps for producing a swirl in the cylinder head of an air intake port system.

In German Document DE 199 44 623 A1, an air intake port system is disclosed in which a swirl flap device is inserted into an insert duct in the air intake port system. The swirl flaps are arranged in an insert piece that is formed by two insert halves placed together. These insert halves are joined together, and via bearing holes support the swirl flap so that the swirl flap is held in place. The entire swirl flap device can then be pushed into a lower part of the housing of the air intake port system and mounted there by using screws.

In German Document DE 196 14 474, an air intake port system is disclosed in which a switch-over flap shaft carries several switch-over flap bodies, wherein the shaft is supported via two-component bearing mating parts. The switch-over flap shaft is placed into the bearing mating parts and the bearing mating parts are pushed into corresponding receiving apertures in the housing of the air intake port system. The switch-over flap device, or the bearing mating parts, are prevented from falling out of place by placing a second housing part of the air intake port system on top of the bearing mating parts. In this manner, the bearing mating parts are gripped from all sides by the housing of the air intake port system. As a result of this construction, a bearing mating part is arranged on both sides of each switch-over flap.

In German Document DE 199 46 861, an air intake port system with a tumble flap device is disclosed that includes a one-piece bearing frame with multiple tumble flaps arranged therein. A number of positioning elements, which are not shown in more detail, are embodied as mating pins and are provided for mounting the bearing frame on the housing of the air intake port system. In this way, a positive engagement connection is made between the bearing frame of the tumble flap device and the housing of the air intake port system, whereby the entire flap device is not prevented from falling out, in the direction of the cylinder head, until the air intake port system is screwed onto the cylinder head.

In German Document DE 101 43 384, an air intake port system with a switch-over flap device is described that includes an insert frame and a pivoted switch-over shaft inserted therein. The reference teaches a one-piece bearing frame that accepts two switch-over flap shafts for a V engine. Here too, the entire insert frame is inserted into corresponding recesses formed in the housing of the air intake port system and is then fixed in the air intake port system by placing the two housing parts together.

Finally, in German Document DE 102 36 393, a tumble flap device for an air intake port system is disclosed wherein an individual bearing element is assigned to each flap. Each tumble flap can be tilted in its respective bearing element. These bearing elements, as taught by German Document DE 102 36 393, are also placed first with the flaps in positive engagement in a first housing part of the air intake port system and are then fixed in place by screwing on a second housing part.

However, to fix a flap by placing two housing parts, one on top of another, requires that the respective flap device be arranged to coincide to where the housing is also divisible at this point. In many cases, however, it is not possible to arrange the flap devices so as to be disposed at a divisible point of a multi-part housing. In these instances, a different mounting must be selected such as by employing screwing, for example. Unfortunately, such a mounting structure, provided with additional mounting means utilizing a frictional connection, leads to a larger number of components. Having to employ a larger number of components results in the additional disadvantage that vibrations from the engine can cause loosening of the mounting means, which can lead to a damaging of the engine as well as interruption in engine function.

On the other hand, a mounting constructed by placing two housing parts, one on top of another, establishes narrow degrees of tolerance that must be strictly adhered to during the manufacture of the corresponding bearing surfaces. Such strict adherence to the narrow degrees of tolerance leads to higher manufacturing costs. Strict adherence to narrow degrees of tolerance is particularly difficult when injection-molded plastic shafts are used, especially those produced in one piece structures incorporating the flaps and also additional stops, where possible. As a rule, this kind of injection-molding leads to the shaft becoming deformed, and such deformation must be compensated for by an exact and fixed arrangement of the bearing elements.

In accordance with the problems encountered in the prior art mountings, an object of the present invention is to create a mounting for a flap device in an air intake port system that successfully mounts the flap device, even at positions in the air intake port system where it is generally not possible to employ the housing components of the air intake port system to positively engage and fix the flap device without using additional mounting means. It is another object, in accordance with the present invention, to achieve an exact fixing of the position of the bearing elements in the housing without having to adhere to narrow tolerances so that cost-effective injection-molded plastic shafts can be used in the construction of an air intake port system. In accordance with the present invention, another object is to provide a flap bearing mounting on an air intake port system that, when compared with mountings employing screws or the like, achieves greater safety and a longer service life.

SUMMARY OF THE INVENTION

The objects of the present invention are achieved in that the at least one bearing element features projections, which in the assembled state, extend through corresponding apertures in the housing of the air intake port system, wherein the at least one bearing element is mounted on the housing by thermoforming of projections. An exact and precise fixing, or mounting, on the housing of the air intake port system is achieved through such structure in a cost-effective manner without requiring use of additional mounting means. Thus, the structure of a flap bearing mounting in accordance with the present invention avoids the use of additional mounting parts, which avoids damage to the engine when such additional mounting parts become detached. In addition, the bearing elements in accordance with the present invention, at least as far as their dimensions are concerned, have a greater range of tolerance than the previously known connections with positive engagement.

In a further embodiment of the present invention, the housing features indentations around the apertures through which the projections of the at least one bearing element extend so, after thermoforming the projections, the surface of the housing is essentially smooth. The result of this thermoforming process is that the mounting of the bearing elements can also take place at a position in the housing within or near the intake pipe. At this position, the projections are arranged in the region of the air-conducting ports and, after the assembly of components and the fixing of the mounting by thermoforming the projections, no additional flow losses are incurred due to the projections.

In another embodiment of the invention, each individual bearing element that is mounted on the housing using the projections has at least two projections. Accordingly, each bearing element receives at least two fixing points by which a twisting of the bearing element, within the air intake port system, is reliably prevented.

In another embodiment of the present invention, the projections are embodied as circular pins and the apertures as holes, resulting in achieving greater ease of manufacture of both the housing part of the intake pipe and the projections on the bearing elements.

Advantageously, the housing of the air intake port system is produced from die casting, in particular magnesium die casting, and the flap device is produced from plastic. Due to the different melting points of the materials, the thermoforming for mounting the bearing elements is thus simple to carry out, and the entire flap device can be produced cost-effectively, for example, using the injection molding method.

In another embodiment of the invention, the housing of the air intake port system is embodied in multiple parts, whereby the flap device is mounted on an upper insert part of the housing. Thus, even when complicated shapes of the intake ports are employed, a die casting method can be used in order to produce the housing of the air intake port system. In addition, to facilitate handling during the production of the connection between the flap device and the upper insert part of the housing, the upper insert part is configured to have a simple shape.

Moreover, it is advantageous to construct the flap bearing mounting of the present invention so that at least one shaped wall surface of the bearing element faces the housing and rests, at least partially, against a correspondingly shaped wall surface of the housing of the air intake port system. In this way, handling is facilitated during the production of the connection, especially since the position of the bearing element on the housing part of the intake pipe can be pre-fixed.

In another embodiment of the present invention, the flap device is arranged in a one- or multi-piece bearing frame in which the flap shaft, with the at least one flap body, is supported, wherein the flap device can be inserted pre-mounted into the housing of the air intake port system. In this manner, the flap device can be introduced into the housing by using only a one process step because a unit fixed completely in itself is provided.

In an alternative embodiment of the present invention, the flap device features at least one bearing element for each flap body, wherein the bearing element is embodied as having one or multiple parts. Depending on the design of the housing of the air intake port system, the shape of the corresponding housing part can be simplified by this construction, yet secure a seat and ensure a good mounting of the entire flap device in the housing.

In yet a further alternative embodiment of the present invention, the flap device features at least one bearing element embodied as multiple parts, whereby one or more first bearing parts enclose the flap shaft entirely, or partially, and rests with one shaped wall surface against correspondingly shaped wall surfaces of the housing of the air intake port system, and one or more second bearing parts feature the projections and rest on the first bearing part(s) in such a way that through thermoforming of the projections extending through the apertures in the housing, the first bearing part(s) is(are) mounted with a positive engagement connection. In such an embodiment, the mounting takes place directly in the corresponding housing part of the air intake port system. Essentially, the same shaped bearing elements can be used for air intake port systems of different sizes but essentially the same shape, so that tool costs and production costs are reduced due to the large number of pieces manufactured and suitable for use.

In yet a further embodiment of the present invention, two flap shafts are mounted in the housing via a one- or multiple-piece bearing frame, so that in a V engine, for example, flap devices assigned to the two banks of cylinders can be mounted in only one mounting step.

Thus, a flap bearing mounting is provided in accordance with the present invention that can be used for all shapes of air intake port systems, wherein the flap bearing mounting can be used without having to use additional mounting means because cost effective switch over flap shafts are used for which separate bearings are needed. Consequently, malfunctions caused, for example, by the loosening of a screw are reliably avoided and the service life of the entire flap device is correspondingly prolonged. Moreover, costs are lowered through the simple mounting and production procedures provided in accordance with the present invention.

More particularly, in accordance with the objects of the present invention, an intake manifold with flap bearing mounting is provided that includes: (a) a housing comprising one or more pieces; (b) a flap device arranged in the housing, wherein the flap device comprises: (i) a flap shaft, wherein at least one flap body is arranged on the flap shaft; and (ii) at least one bearing element supporting the flap shaft, wherein the flap device is mounted in the housing of the intake manifold by the at least one bearing element, wherein the at least one bearing element comprises first projections that extend through corresponding apertures formed in the housing of the intake manifold in an assembled state, wherein the at least one bearing element is mounted on the housing by thermoformed projections formed by thermoforming the first projections.

In another embodiment of the present invention, the housing further comprises indentations formed around the apertures through which the first projections of the at least one bearing element extend, wherein the housing further comprises an essentially smooth surface and each thermoformed projection forms a portion of the essentially smooth surface. In yet another embodiment of the present invention, each individual bearing element mounted on the housing via the thermoformed projections includes at least two thermoformed projections. In accordance with yet another embodiment of the present invention, the first projections are circular pins and the apertures are holes. In still another embodiment in accordance with the present invention, the housing of the intake manifold is die cast by magnesium die casting and the flap device is formed from plastic.

In another embodiment of the present invention, the housing of the intake manifold includes multiple pieces assembled together and the flap device is mounted on an upper insert part of the housing. In yet another embodiment of the present invention, at least one shaped wall surface of the bearing element faces the housing and rests at least partially against a correspondingly shaped wall surface of the housing of the intake manifold. In still another embodiment of the present invention, the flap device is arranged in a one-piece, or multi-piece, bearing frame so the flap shaft, with the at least one flap body, is supported, and the flap device is insertably pre-mounted into the housing of the intake manifold. In another embodiment, in accordance with the present invention, the flap device includes at least one bearing element for each flap body, wherein each bearing element comprises one or multiple parts.

In another embodiment of the present invention, the flap device comprises: at least one bearing element having multiple parts assembled together, wherein one or more first bearing parts enclose the flap shaft, either entirely or partially, and rest with one shaped wall surface against a correspondingly shaped wall surface of the housing of the intake manifold; and one or more second bearing parts comprising the projections, wherein the one or more second bearing parts rest on the one or more first bearing parts so by thermoforming of the first projections extending through the apertures in the housing, the one or more first bearing parts are mounted in the housing by a positive engagement connection. In yet another embodiment of the present invention, two flap shafts are mounted in the housing by a one-piece, or multi-piece, bearing frame.

In accordance with still another embodiment of the present invention, a combustion engine is provided with an intake manifold having a flap bearing mounting, wherein the intake manifold includes: (a) a housing comprising one or more pieces; (b) a flap device arranged in the housing, wherein the flap device comprises: (i) a flap shaft, wherein at least one flap body is arranged on the flap shaft; and (ii) at least one bearing element supporting the flap shaft, wherein the flap device is mounted in the housing of the intake manifold by the at least one bearing element, wherein the at least one bearing element comprises first projections that extend through corresponding apertures formed in the housing of the intake manifold in an assembled state, wherein the at least one bearing element is mounted on the housing by thermoformed projections formed by thermoforming the first projections.

Further objects, features and advantages of the present invention will become apparent from the Detailed Description of Illustrative Embodiments, which follows, when considered together with the attached drawings.

BRIEF DESCRIPTION OF THE DRAWINGS

In the drawings, two exemplary embodiments are shown and are described below.

DETAILED DESCRIPTION OF ILLUSTRATIVE EMBODIMENTS

Figure 1:
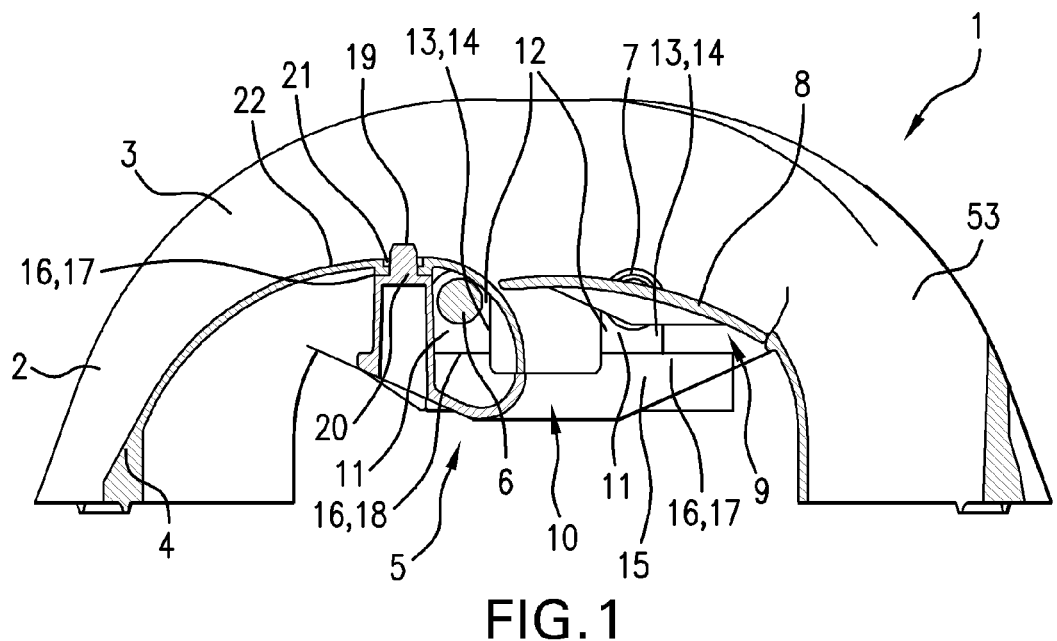
FIG. 1 is a side sectional view of one illustrative embodiment of a flap bearing mounting in accordance with the present invention.

The apparatus of the present invention is a flap bearing mounting on an air intake port system of a combustion engine. The present invention will be described with reference to the Figures, wherein like parts are labeled with like reference characters. Thus, parts with the same function are labeled with the same reference numbers.

FIG. 1 shows a first exemplary embodiment, in accordance with the present invention, of an air intake port system 1 (also referred to as an "intake manifold") with a flap bearing mounting. The intake manifold 1 includes a multipart housing 2, which includes the upper part 3 of the housing and the upper insert part 4 as shown in FIG. 1. The flap bearing is mounted on the upper insert part 4 so that a flap device 5 can be properly aligned and fixed to serve as a switch-over flap device for changing the effective length of the swing pipe.

The flap device 5 includes two switch-over flap shafts 6 and 7 on which switch-over flap bodies 8 (only one shown in FIG. 1) are arranged. These switch-over flap bodies 8 can be turned by an adjusting device (not shown) into a position that switches open, or closes, a short-circuit path 9 thereby changing the effective length of the swing pipe in a manner that is conventionally known. The switch-over bodies 8 are preferably manufactured in one piece incorporated with the respective flap shaft 6 or 7. In other words, a switch-over body 8 and the flap shaft 6 can be manufactured as a single, monolithic piece and a switch-over body and the flap shaft 7 can be manufactured as another single, monolithic piece.

The flap device 5 also includes a multi-part bearing element 10 in which, in the present exemplary embodiment, two first bearing parts 11 respectively serve to accept the flap shafts 6, 7. The first bearing parts 11 are arranged, respectively, between the flap bodies 8. These bearing parts 11 can likewise be embodied as one or two pieces. The first bearing parts 11, with the flap shafts 6, 7 and the flap bodies 8 arranged thereon, are inserted as an assembly into recesses 12 in the housing 2 so that the respective wall surfaces 13 of the first bearing parts 11 are facing the air intake port system to match, or mate, to the correspondingly shaped wall surfaces 14 of the recesses 12. In this way, by matingly matching wall surfaces 13 to correspondingly shaped wall surfaces 14 a defined position of the flap shafts 6, 7 is provided that has only one degree of freedom against the insertion direction. In other words, the wall surfaces 13 and 14 are correspondingly shaped so there is only one match, which means there is only one way the first bearing parts 11 fit together with the recesses 12.

Figure 3:
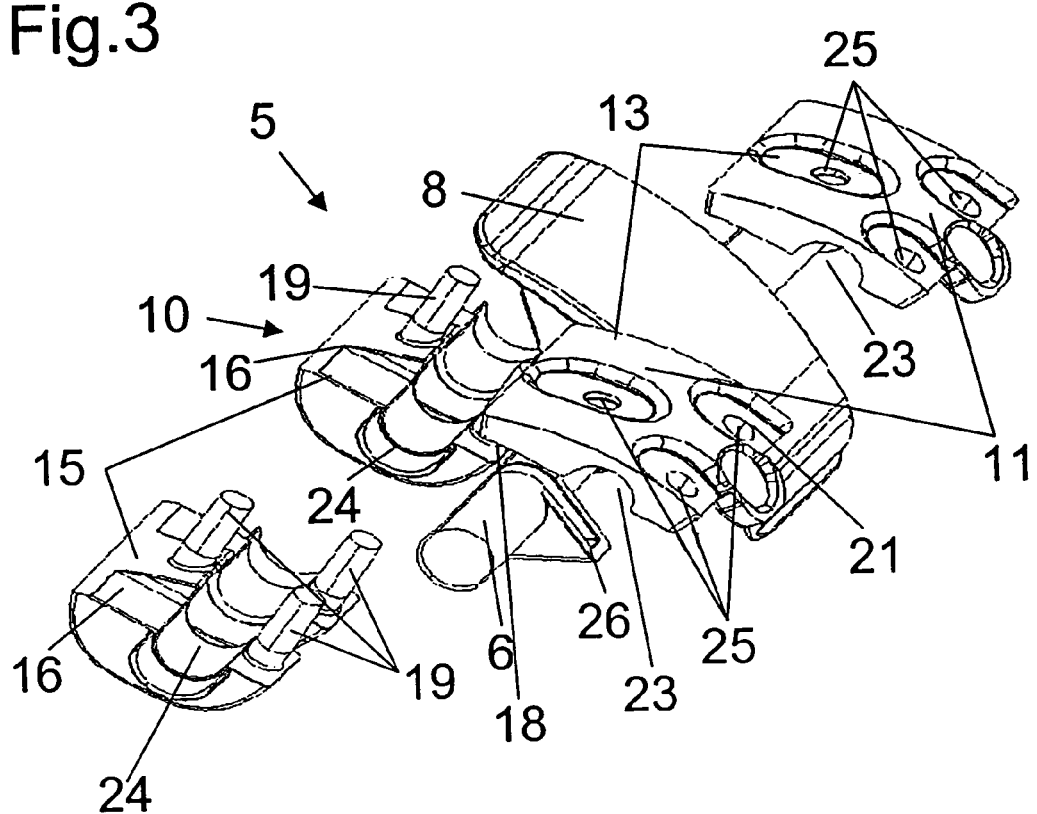
FIG. 3 shows an exploded perspective view of a large portion of the flap bearing mounting corresponding to the smaller portion shown in FIG. 2, wherein the structure shown in FIG. 3 is shown without the housing of the air intake port system to improve clarity.

In order to secure the final fixing of the first bearing parts 11 to the upper insert part 4, a second bearing part 15 (also known as the "bearing frame") is provided as a one-piece bearing frame that is placed on the upper insert part 4. The bearing frame 15 is shaped such that a portion of its wall surfaces 16, which face the upper insert part 4, rest on correspondingly shaped wall surfaces 17 of the upper insert part 4. The bearing frame 15 is also shaped so that another portion of its wall surfaces 16, which face the upper insert part 4, rest on correspondingly shaped, preferably smooth, free wall surfaces 18 of the first bearing parts 11. As a result of this construction, when the bearing frame 15 is mounted on the upper insert part 4, the first bearing parts 11 for each flap shaft 6, 7 for both cylinder banks is held with a positive engagement in a corresponding recesses 12 of the housing 2. As shown in FIG. 3, for each bearing frame 15 there is a corresponding first bearing part 11 to which the bearing frame 15 will be attached. While FIG. 3 illustrates that each bearing frame 15 and first bearing part 11 pair secures only one flap shaft, either 6 or 7, a person skilled in the art should realize that a single bearing frame and first bearing part pair could be configured to secure both flap shafts 6 and 7 without departing from the scope of the present invention.

Figure 2:
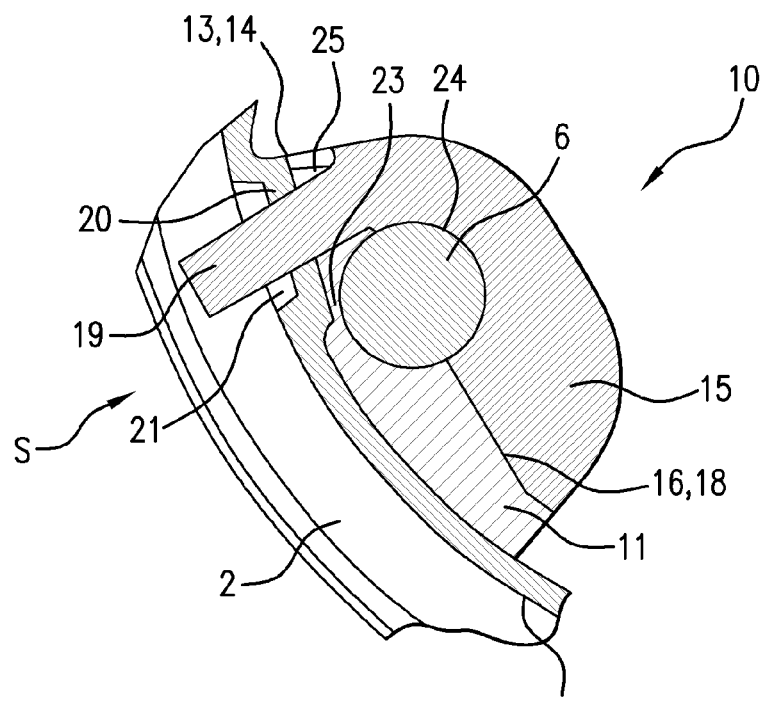
FIG. 2 illustrates a portion of a flap bearing mounting shown in a side sectional view as an alternate embodiment of the present invention.
Figure 4:
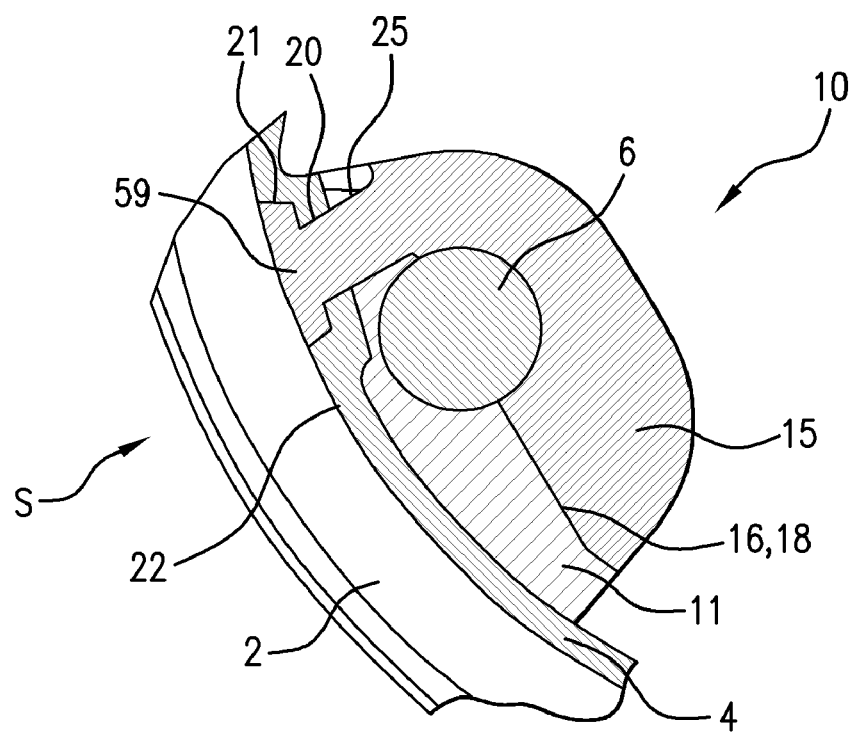
FIG. 4 shows the flap bearing mounting illustrated in FIG. 2, but after the thermoformable pin 19 has been thermoformed to produce a thermoformed pin 59.

The mounting of a bearing frame 15 to upper insert part 4 and to a first bearing part 11 is achieved, in accordance with the present invention, by the thermoforming of projections 19 arranged on the bearing frame 15 and extending through apertures 20 in the upper insert part 4. The projections 19 are embodied, as shown in FIG. 2, as pins and the apertures 20 as holes. The upper insert part 4 features indentations 21, respectively, located to correspond to, and to align at, the holes 20 on the side through which the pins 19 extend. During the thermoforming of the pins 19, the liquefied material of the pins 19 flows into these indentations 21 and then solidifies as a thermoformed pin 59 as shown in FIG. 4. The volume of the indentations 21 corresponds, as accurately as possible, to the liquefied volume of the pins 19. In this way, the formation of the thermoformed pin 59 results in a continuous smooth surface 22 of the upper insert part 4 after the thermoforming of the pins 19 thereby preventing flow loss during use of the air intake port system. Thus, care is taken to ensure that the volume of the material of pin 19 liquefied during thermoforming is equal to, or nearly equal to, the volume of the indentation 21 so that the smooth surface 22 is maintained and flow losses along the surface 22 are minimized during use of the air intake port system.

Thus, by thermoforming, an exact fixing of the entire flap device 5 on the upper insert part 4 is achieved so that the upper insert part 4 can now be inserted into the housing upper part 3 and mounted. Furthermore, air intake ports 53 lead to the two cylinder banks (not shown), which permits easy assembly of the air intake port system 1. In accordance with the present invention, the ends of the two flap shafts 6, 7 can be connected together via a connecting rod (not shown) so that the two flap shafts can be activated jointly by an adjusting device.

In FIGS. 2 and 3, this illustrative embodiment in accordance with the present invention demonstrates the flap device 5 as comprising the flap shaft 6 with flap bodies 8 arranged thereon, whereby a two-part bearing element 10 is arranged respectively between each flap body 8. In this embodiment, more than two flap bodies 8 can be arranged on the flap shaft 6. Each bearing element 10 features a first bearing part 11 and a second bearing part 15, between which a flap shaft 6 is pivoted.

Mounting is accomplished by placing the first bearing parts 11 on the housing 2 with their wall surfaces 13 aligned to correspond to the wall surfaces 14 of the housing 2 of the air intake port system 1. Then, the flap shaft 6 with the flap bodies 8 arranged thereon is inserted into corresponding semicircular recesses 23 of the first bearing parts 11. To securely mount these first bearing parts 11, and thus the entire flap device 5 to the housing 2, the second bearing parts 15, which have a semicircular recess 24, are placed respectively on the first bearing parts 11 and the flap shaft 6. The second bearing parts 15 have wall surfaces 16 shaped correspondingly to match the wall surfaces 18 of the first bearing parts 11. In addition, holes 20 have been previously formed in the housing 2, and the first bearing parts 11 likewise feature holes 25 through which the pins 19 of the second bearing parts 15 are conducted.

The secure mounting of the entire flap device 5 is accomplished by the thermoforming of projections or pins 19 from the side of the housing 2 facing away from the bearing elements 10. Indentations 21 are located on side in the housing 2, wherein flowable material of the pins 19 is distributed, during the thermoforming, into the indentations 21 so that an essentially smooth housing surface 22 is formed by completion of the thermoforming. In order to ensure a complete and secure fixing of each bearing element 10 to the housing 2, each second bearing part 15 also has at least two projections 19, preferably three projections 19 as shown in FIG. 3, which are inserted through the holes 20 and then thermoformed to form thermoformed pins 59 as shown in FIG. 4.

FIG. 3 also demonstrates that a stop 26 can be arranged to stop on the first bearing parts 11 to limit the flap placement angle by engaging with a stop portion of the first bearing part 11. Thus, stop 26 can be rotated to work in one direction as a stop when engaging a first journal portion (i.e. a stop portion) of the first bearing part 11, and the stop 26 can be rotated to work in the opposite direction as a stop when engaging a second journal portion (i.e. a stop portion) of the second bearing part 15 as evident from FIG. 3. In embodiments, in accordance with the present invention where a stop 26 is employed, the last bearing element 10 of the flap device 5 can be constructed as one piece featuring only two projections or pins 19, which when fully installed extend through corresponding holes 20 into the housing 2. Because shaft 6 is provided with flap bodies 8 arranged thereon in the manner shown in FIG. 3, the last bearing element 10, having only two projections or pins 19, can be assembled from the side and then securely mounted by thermoforming.

Moreover, it is within the scope of the present invention to provide corresponding projections and recesses arranged between the first bearing part 11 and the second bearing part 15 so that the two bearing parts 11, 15 can optionally be clipped together.

Persons of ordinary skill in the art should recognize, from the exemplary embodiments described above, that due to the flap bearing mounting structure according to the present invention an exact position of the flap device 5 can be fixed in all conceivable embodiments of air intake port systems. Consequently, cost-effective switch-over flap shafts can be used in the construction of air intake port systems without having to employ additional mounting means, such as screws.

Persons of ordinary skill in the art should also recognize that different embodiments, in accordance with the present invention, are conceivable. For example, one-piece bearing frames or one-piece bearing elements can also be arranged between the flaps. In the case where one-piece bearing frames or one-piece bearing elements are used, it is necessary to injection-mold the flap shaft with the flap bodies in the bearing element assembly. However, persons skilled in the art would realize that any other manner of dividing the individual bearing elements is possible within the scope of the present invention. Furthermore, in accordance with the present invention, a mounting on any desired housing part of the air intake port system can be achieved through the thermoforming of appropriate projections.

Persons of ordinary skill in the art would also appreciate that the use of a flap bearing mounting, in accordance with the present invention, is not restricted to switch-over flaps, but is equally suitable and can be employed for mounting any type of bearing elements, such as tumble or swirl flap shafts in air intake port systems of combustion engines. While the present invention has been described with reference to certain illustrative embodiments, one of ordinary skill in the art will recognize that additions, deletions, substitutions, modifications and improvements can be made while remaining within the spirit and scope of the present invention as defined by the claims.

What is claimed is:

1. An intake manifold with flap bearing mounting, comprising:
   (a) a housing comprising one or more pieces;
   (b) a flap device arranged in the housing, wherein the flap device comprises:
      i. a flap shaft, wherein at least one flap body is arranged on the flap shaft; and
      ii. at least one bearing element supporting the flap shaft, wherein the flap device is mounted in the housing of the intake manifold by the at least one bearing element, wherein the at least one bearing element comprises first projections that extend through corresponding apertures formed in the housing of the intake manifold in an assembled state, wherein the at least one bearing element is mounted on the housing by thermoformed projections formed by thermoforming the first projections.

2. An intake manifold according to claim 1, wherein the housing further comprises indentations formed around the apertures through which the first projections of the at least one bearing element extend, wherein the housing further comprises an essentially smooth surface and each thermoformed projection forms a portion of the essentially smooth surface.

3. An intake manifold according to claim 1, wherein each individual bearing element mounted on the housing via the thermoformed projections includes at least two thermoformed projections.

4. An intake manifold according to claim 1, wherein the first projections are circular pins and the apertures are holes.

5. An intake manifold according to claim 1, wherein the housing of the intake manifold is die cast by magnesium die casting and the flap device is formed from plastic.

6. An intake manifold according to claim 1, wherein the housing of the intake manifold includes multiple pieces assembled together and the flap device is mounted on an upper insert part of the housing.

7. An intake manifold according to claim 1, wherein at least one shaped wall surface of the bearing element faces the housing and rests at least partially against a correspondingly shaped wall surface of the housing of the intake manifold.

8. An intake manifold according to claim 1, wherein the flap device is arranged in a one-piece, or multi-piece, bearing frame so the flap shaft, with the at least one flap body, is supported, and the flap device is insertably premounted into the housing of the intake manifold.

9. An intake manifold according to claim 8, wherein two flap shafts are mounted in the housing by a one-piece, or multi-piece, bearing frame.

10. An intake manifold according to claim 1, wherein the flap device includes at least one bearing element for each flap body, wherein each bearing element comprises one or multiple parts.

11. An intake manifold according to claim 1, wherein the flap device comprises:
    at least one bearing element having multiple parts assembled together, wherein one or more first bearing parts enclose the flap shaft, either entirely or partially, and rest with one shaped wall surface against a correspondingly shaped wall surface of the housing of the intake manifold; and
    one or more second bearing parts comprising the projections, wherein the one or more second bearing parts rest on the one or more first bearing parts so by thermoforming of the first projections extending through the apertures in the housing, the one or more first bearing parts are mounted in the housing by a positive engagement connection.

12. An intake manifold according to claim 10, wherein two flap shafts are mounted in the housing by a one-piece, or multi-piece, bearing frame.

13. A combustion engine provided with an intake manifold having a flap bearing mounting, comprising:
    (a) a housing comprising one or more pieces;
    (b) a flap device arranged in the housing, wherein the flap device comprises:
       i. a flap shaft, wherein at least one flap body is arranged on the flap shaft; and
       ii. at least one bearing element supporting the flap shaft, wherein the flap device is mounted in the housing of the intake manifold by the at least one bearing element, wherein the at least one bearing element comprises first projections that extend through corresponding apertures formed in the housing of the intake manifold in an assembled state, wherein the at least one bearing element is mounted on the housing by thermoformed projections formed by thermoforming the first projections.

* * * * *